(12) United States Patent
Kamamoto et al.

(10) Patent No.: US 8,986,145 B2
(45) Date of Patent: Mar. 24, 2015

(54) POWER TRANSMISSION CHAIN AND POWER TRANSMISSION SYSTEM

(75) Inventors: Shigeo Kamamoto, Kashiwara (JP); Seiji Tada, Kashiba (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 807 days.

(21) Appl. No.: 12/733,805

(22) PCT Filed: Sep. 24, 2008

(86) PCT No.: PCT/JP2008/067141
§ 371 (c)(1),
(2), (4) Date: Mar. 22, 2010

(87) PCT Pub. No.: WO2009/041405
PCT Pub. Date: Apr. 2, 2009

(65) Prior Publication Data
US 2010/0203988 A1    Aug. 12, 2010

(30) Foreign Application Priority Data
Sep. 25, 2007  (JP) .................................. 2007-246916

(51) Int. Cl.
F16H 7/22  (2006.01)
F16H 9/24  (2006.01)
F16G 5/18  (2006.01)

(52) U.S. Cl.
CPC ... F16H 9/24 (2013.01); F16G 5/18 (2013.01)
USPC ....................................................... 474/245

(58) Field of Classification Search
CPC ..................................... F16G 5/18; F16H 9/24
USPC ........................... 474/245, 215, 229, 216, 206
See application file for complete search history.

(56) References Cited

U.S. PATENT DOCUMENTS 1,651,832 A * 12/1927 Morse ........................... 474/216
2,725,755 A * 12/1955 Riopelle et al. ................ 474/157

(Continued)

FOREIGN PATENT DOCUMENTS

EP    1 555 455 A2    7/2005
EP    1 688 640 A1    8/2006

(Continued)

OTHER PUBLICATIONS

Extended European Search report dated Nov. 21, 2011.

Primary Examiner — Henry Liu
(74) Attorney, Agent, or Firm — McGinn IP Law Group, PLLC (57) ABSTRACT

There are provided a power transmission chain which can reduce a noise level further by eliminating unfavorable combinations from a random arrangement of combinations of pitch lengths and pin shapes and a power transmission system using the same power transmission chain.

With respect to pitch length, links include two types of a link L1 which has a small pitch length and a link L2 which has a large pitch length. With respect to pin shape, pins include two types a pin P1 of which a curvature of a rolling contact surface is large and a pin P2 of which the curvature of the rolling contact surface is small. The links are arranged so that a possibility is avoided that a combination of (L2, P2) and a combination of (L2, P1) come immediately after a combination of (L1, P2) in a chain traveling direction, and that a possibility is adopted that a combination of (L1, P2) or a combination of (L1, P1) comes immediately after the combination of (L1, P2).

8 Claims, 6 Drawing Sheets

(56) References Cited

U.S. PATENT DOCUMENTS

| | | | |
|---|---|---|---|
| 3,043,154 A * | 7/1962 | Karig et al. | 474/215 |
| 5,427,583 A * | 6/1995 | Wolf | 474/206 |
| 5,651,746 A * | 7/1997 | Okuda | 474/215 |
| 5,728,021 A * | 3/1998 | van Rooij et al. | 474/229 |
| 6,186,921 B1 * | 2/2001 | Kotera | 474/215 |
| 6,346,058 B1 * | 2/2002 | Linnenbrugger et al. | 474/215 |
| 6,432,011 B1 * | 8/2002 | Kanehira et al. | 474/215 |
| 7,892,127 B2 * | 2/2011 | Tada et al. | 474/245 |
| 2005/0187057 A1 * | 8/2005 | Lou | 474/245 |
| 2008/0161148 A1 * | 7/2008 | Tada et al. | 474/245 |

FOREIGN PATENT DOCUMENTS

| | | |
|---|---|---|
| EP | 1 698 800 A1 | 9/2006 |
| JP | 2006-2783 | 1/2006 |
| JP | 2006-97844 | 4/2006 |
| JP | 2006-105355 | 4/2006 |
| JP | 2006-242374 | 9/2006 |
| WO | WO 2006/082937 A1 | 8/2006 |

\* cited by examiner

POWER TRANSMISSION CHAIN AND POWER TRANSMISSION SYSTEM

TECHNICAL FIELD

The present invention relates to a power transmission chain and more particularly to a power transmission chain suitable for a continuously variable transmission (CVT) for vehicles such as motor vehicles and a power transmission system.

BACKGROUND ART

Figure 8:
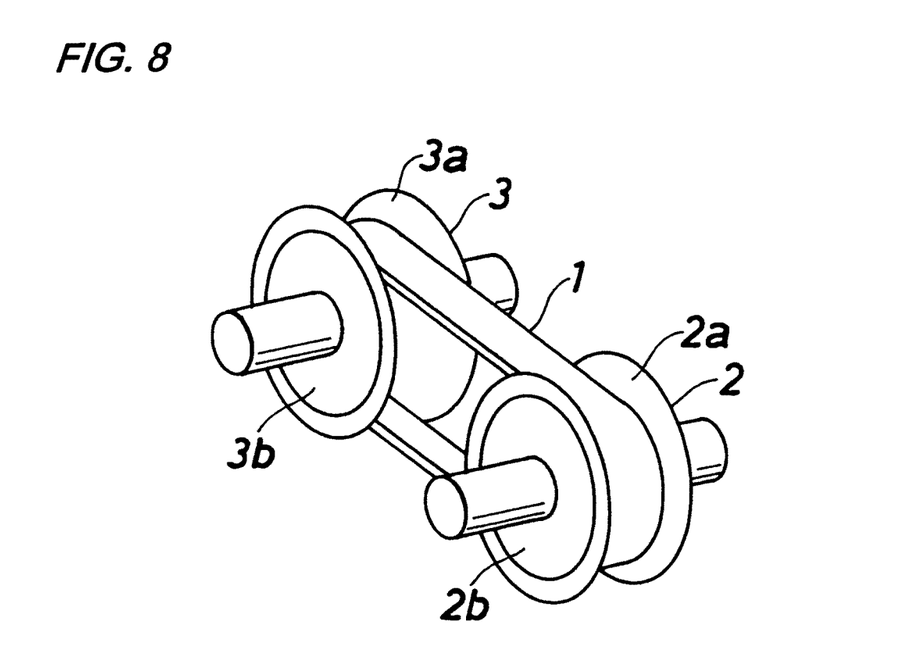
FIG. 8 is a perspective view showing a continuously variable transmission.

As an automotive continuously variable transmission, there is known a continuously variable transmission as shown in FIG. 8 which comprises a drive pulley (2), having a fixed sheave (2a) and a movable sheave (2b) and provided on an engine's side, a driven pulley (3), having a fixed sheave (3a) and a movable sheave (3b) and provided on a drive wheels' side, and an endless power transmission chain (1) extended between the two pulleys and in which the chain (1) is clamped by means of hydraulic pressure by causing the movable sheaves (2b)(3a) to move towards or away from the fixed sheaves (2a)(3b) by a hydraulic actuator, so that a contact load is generated between the pulleys (2)(3) and the chain (1) by virtue of the clamping force to thereby transmit torque by friction force at the contact portion.

As the power transmission chain, Patent Document 1 proposes a power transmission chain which comprises a plurality of links having front and rear inserting portions through which pins are inserted, and a plurality of first pins and a plurality of second pins for connecting together the links which are aligned in a chain width direction so that the front inserting hole of one link corresponds to the rear inserting hole of the other link so as to allow the links to bend relative to each other in a length direction, wherein the first pin which is fixed in the front inserting portion of one link and is movably fitted in the rear inserting hole in the other link and the second pin which is movably fitted in the front inserting hole in one link and is fixed in the rear inserting hole in the other link are brought into rolling contact motion relative to each other to thereby enable the links to bend relative to each other in the length direction, and to reduce noise and vibration, it is proposed to have two or more pitch lengths of the links, rolling contact surface shapes of the pins and contact positions (offset amounts) of the pins with surfaces of the pulleys.

Patent Document 1: JP-2006-242374

DISCLOSURE OF THE INVENTION

Problem that the Invention is to Solve

In the power transmission chain described in Patent Document 1 above, the noise level can be reduced by combining the plurality of links having different pitch lengths and the pins having different shapes. However, since the direction of speed of the pins and the direction of speed of the pulleys at their colliding position do not coincide with each other, the relative speed difference when the pins enter the pulleys is increased depending on random combinations of pitch lengths and pin shapes, which sometimes affects badly the reduction in noise level.

An object of the invention is to provide a power transmission chain which can reduce the noise level further by eliminating unfavorable arrangements of pitch length and pin shape from random arrangements thereof by paying attention to relative collision speed and a power transmission system using the power transmission chain.

Means for Solving the Problem

According to the invention, there is provided a power transmission chain comprising a plurality of links each having front and rear inserting portions through which pins are inserted and a plurality of first pins and a plurality of second pins which are aligned before and after for connecting together the links which are aligned in a chain width direction so that the front inserting hole of one link corresponds to the rear inserting hole of the other link and in which the links can bend relative to each other in a length direction by relative rolling contact motions of the first and second pins and the links having different pitch lengths and the pins having different pin shapes are combined for arrangement, characterized in that with respect to pitch length, the links include two types of links, a link L1 having a small pitch length and a link L2 having a large pitch length and with respect to pin shape, the pins include two types of pins, a long pin (or a pin having a rolling contact surface with a large curvature) P1 and a short pin (or a pin having a rolling contact surface with a small curvature) P2, and in that the links and the pins are arranged so that either of a combination of (L1, P2) and a combination of (L1, P1) comes immediately after the combination of (L1, P2) in a chain traveling direction.

When combining the two types of links (L1 and L2) having the different pitch lengths and the two types of pins (P1 and P2) having the different pin shapes, there are four combinations of (L1, P1), (L1, P2), (L2, P1) and (L2, P2). In the conventional random arrangement, the arrangement has been considered good from the viewpoint of "random" that all the four types of combinations come to appear after each combination. However, when considering the relative collision speed (a speed difference between the pins and the links which is caused by the fact that the direction of speed of the pulleys and the direction of speed of the pins at their colliding position are different), since a combination having a large relative collision speed can be a cause for an increase in noise level, adopting the random arrangement simply possibly interrupts reduction in relative collision speed. For example, assuming that (L1, P1) makes a reference, there are combinations (L1, P1), (L1, P2), (L2, P1) and (L2, P2) as combinations to follow the reference combination, and although there is the fact that the noise level differs depending on which combination follows the reference combination, a series of combinations like one described above has never been considered.

In the power transmission chain according to the invention, a reduction in noise level is realized by eliminating an unfavorable combination following the reference combination by paying attention to relative collision speed.

Specifically, with respect to pitch length, the links include the link L1 which has the small pitch length and the link L2 which has the large pitch length. With respect to pin shape, the pins include the pin P1 which is long or of which the curvature of the rolling contact surface is large and the pin P2 which is short or of which the curvature of the rolling contact surface is small. Then, when considering the combination of the links and the pins for arrangement, the possibility is avoided that the combination of (L2, P2) and the combination of (L2, P1) come immediately after the reference combination in the chain traveling direction, and the combination of (L1, P2) and the combination of (L1, P1) are adopted.

Since the two types of links having the different pitch lengths are adopted, a striking noise generation cycle is changed to be inconsistent, whereby the peak of the sound level pressure is reduced. Since the 2-level is adopted as to the lengths of the pins, the position where the pins contact the pulleys becomes the 2-level, whereby the peak of the sound pressure level is reduced. In addition, as to the rolling contact surface shapes of the first pin and the second pin, the locus of the contact position of the first and second pins is made into an involute curve, and the 2-level is adopted for the radius of a base circle of the involute, whereby the peak of the sound pressure level is reduced. As to the pins, even when the pins are classified into the long pin P1 and the short pin P2 or into the pin P1 of which the curvature of the rolling contact surface is large and the pin P2 of which the curvature of the rolling contact surface is small, the same advantage can be obtained. Normally, in the first pins and the second pins, the rolling contact surface of either of the first and second pins is formed into a flat surface, whereas the rolling contact surface of the other is formed into an involute curved surface which enables a relative rolling contact motion. However, the respective contact surfaces of the first and second pins may be formed into required curved surfaces.

One of the first and second pins is preferably fixed in a fixing portion provided in a front portion of the front inserting hole of one link and is fitted movably in a pin movable portion provided in a front portion of the rear inserting portion of the other link. The other of the first and second pins is preferably fitted movably in a pin movable portion provided in a rear portion of the front inserting portion of one link and is fixed in a pin fixing portion provided in a rear portion of the rear inserting hole in the other link.

Fixing the pin in the pin fixing portion is implemented by fitting fixation between an inner edge of the fixing portion and an outer circumferential surface of the pin based on mechanical press fitting. However, instead of this, shrink fitting or cold fitting may be adopted. Fitting fixation is preferably implemented at edges (upper and lower edges) of portions of the pin fixing portion which intersect the length direction at right angles. A pre-tension is applied in a pre-tension application step after the fitting fixation, a residual compression stress is applied to the pin fixing portion (the pin press fitting portion) of the link uniformly and properly.

In the power transmission chain of the invention, at least one of the first pin and the second pin is brought into contact with the pulley to transmit power by frictional force. In the chain in which either of the pins is brought into contact with the pulley, either of the first pin and the second pin is made to be a pin that is to be brought into contact with the pulley when the chain is used in a variously continuous transmission (hereinafter, referred to as a "first pin" or "pin"), and the other is made to be a pin that is not brought into contact with the pulley (referred to as an inter-piece or strip, and hereinafter, referred to as a "second pin" or "inter-piece").

The links are made of a spring steel or carbon tool steel. The material of the links is not limited to the spring steel or carbon tool steel but other steels such as a bearing steel may be used. In the links, the front and rear inserting portions may be formed individually as an independent through hole (a pillared link), or the front and rear inserting portions may be formed into a single through hole (a pillarless link). As a material for the pins, an appropriate steel is used which includes a bearing steel.

In this description, although one end side in the length direction of the link is referred to as front and the other end side as rear, this definition of front and rear is just for the sake of convenience. Therefore, the definition used herein does not mean that the length direction of the link does not necessarily coincide with a front-rear direction at all times.

In the power transmission chain, either of the pins (the inter-piece) is made shorter than the other pin (the pin), and end faces of the longer pin contact surfaces of half cone pulleys of the pulleys of the continuously variable transmission, whereby power is preferably transmitted by frictional force produced by the contact. Each pulley is made up of a fixed sheave having a conical sheave surface and a movable sheave having a conical sheave surface, and the chain is held between the sheave surfaces of both the sheaves. Then, by causing the movable sheave to move by a hydraulic actuator, a distance between the sheave surfaces or a chain wrap contact diameter of the continuously variable transmission is changed, whereby a smooth, stepless change-speed can be implemented.

A power transmission system according to the invention comprises a first pulley having conical sheave surfaces, a second pulley having conical sheave surfaces, and a power transmission chain which is extended between the first pulley and the second pulley, wherein the power transmission chain that has been described above is used as the power transmission chain.

This power transmission system becomes suitable for use as a continuously variable transmission for a vehicle such as a motor vehicle.

Advantage of Invention

According to the power transmission chain and the power transmission system of the invention, the reduction in noise level is realized by eliminating the following of the unfavorable combinations by paying attention to relative collision speed, thereby making it possible to reduce the noise level with good efficiency only with the alteration of the arrangement of the links and the pins, without altering the shapes of the links and the pins.

BRIEF DESCRIPTION OF THE DRAWINGS

FIGS. 6(a)(b) are graphs showing relative collision speeds as the results of an analysis on the arrangements shown in FIGS. 5(a)(b).

BEST MODE FOR CARRYING OUT THE INVENTION

Hereinafter, referring to the drawings, an embodiment of the invention will be described. When used in the following description, "vertical" should be based on a vertical orientation in FIG. 2.

Figure 1:
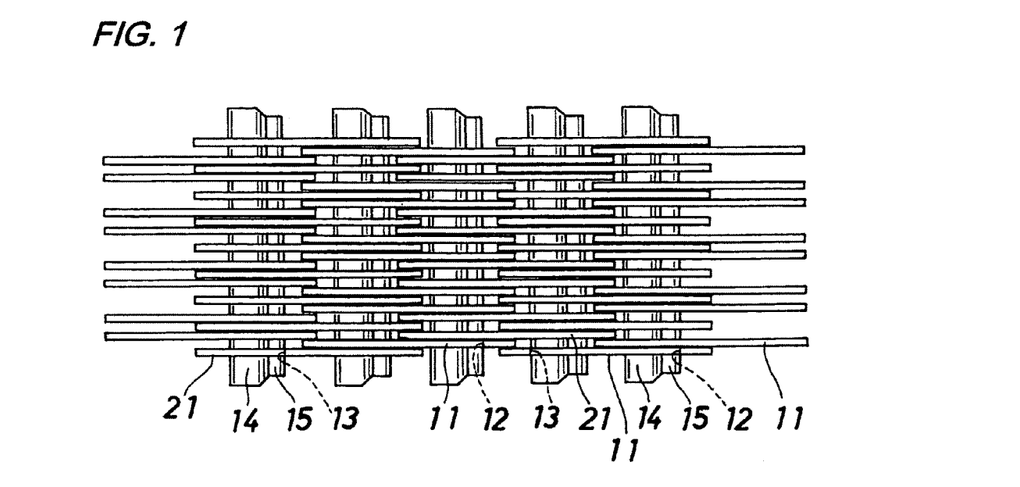
FIG. 1 is a plan view showing part of one embodiment of a power transmission chain of the invention.

FIG. 1 shows part of a power transmission chain according to the invention, and the power transmission chain (1) includes a plurality of links (11)(21) having front and rear inserting portions (12)(13) which are provided at a predetermined interval in a length direction of the chain, and pluralities of pins (first pins) (14) and inter-pieces (second pins) (15) for connecting together the links (11)(21) which are aligned in a width direction of the chain so that the links can bend in the length direction. The inter-piece (15) is made shorter than the pin (14), and they are made to face each other in such a state that the inter-piece (15) is disposed on a front side and the pin (14) is disposed on a rear side.

Figure 2:
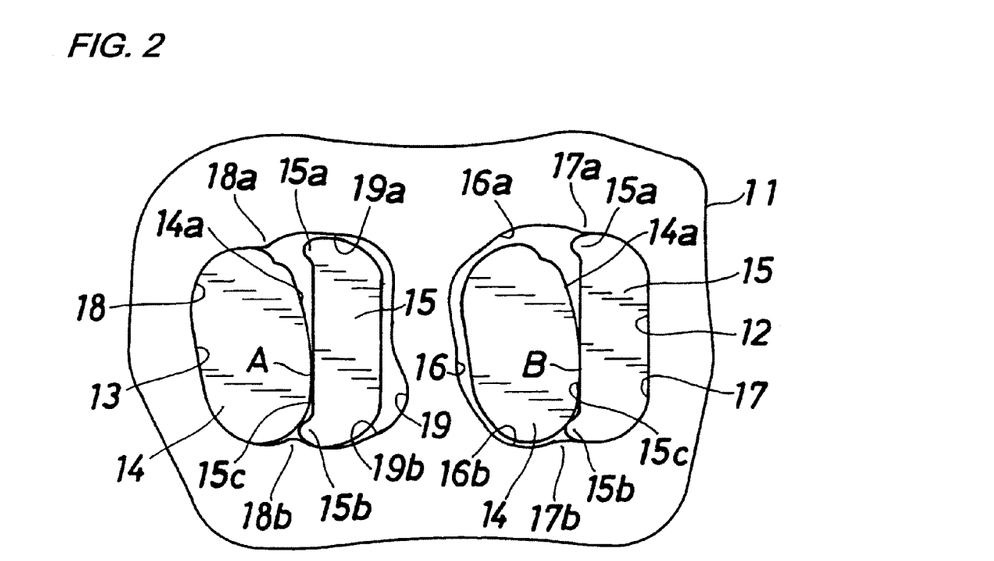
FIG. 2 is an enlarged side view showing reference shapes of a link, a pin and an inter-piece.
Figure 3:
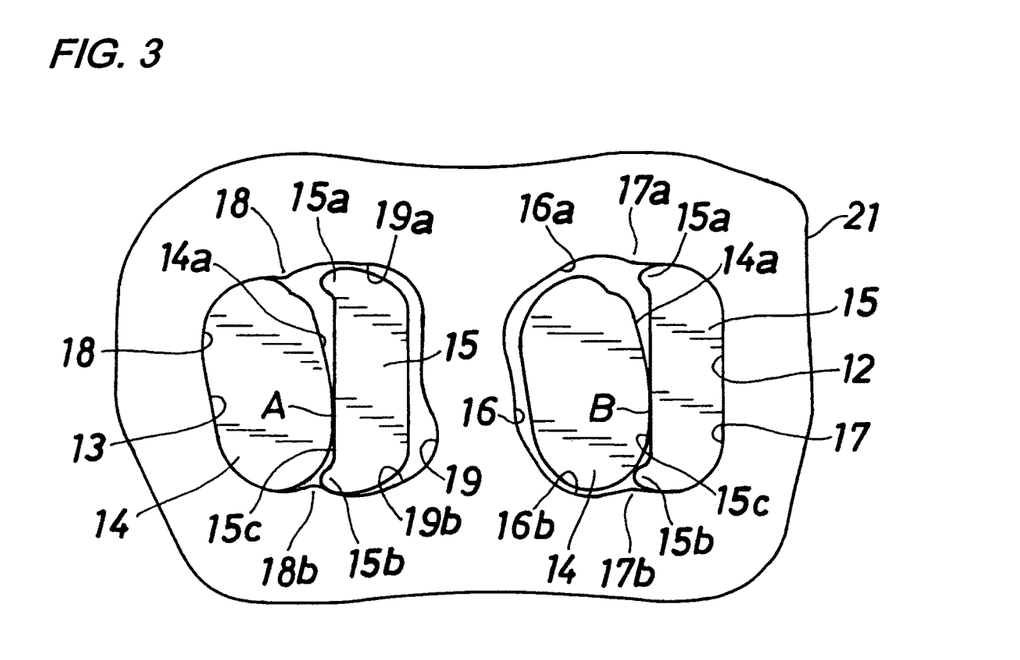
FIG. 3 is an enlarged side view showing a shape of a link having a different pitch length.

In the power transmission chain (1) of the invention, as to the links (11)(21), two types of links are prepared, one (11) shown in FIG. 2 and the other (21) shown in FIG. 3. As to a cross-sectional shape of the pin (14), two types of cross-sectional shapes are prepared, one shown in FIG. 4(a) and the other shown in FIG. 4(b).

In the chain (1), three link rows, each row comprising a plurality of links which are in the same phase in the width direction, are aligned in a traveling direction (a front-rear direction) to thereby be formed into one link unit, and a plurality of link units each comprising three link rows area connected together in the traveling direction, whereby the power transmission chain (1) is formed. In this embodiment, one link unit is made up of one link row containing nine links and two link rows each containing eight links.

As is shown in FIGS. 2 and 3, the front inserting portion (12) of the links (11)(21) is made up of a pin movable portion (16) in which the pin (14) is fitted movably and an inter-piece fitting portion (17) in which the inter-piece (15) is fixed. The rear inserting portion (13) is made up of a pin fixing portion (18) in which the pin (14) is fixed and an inter-piece movable portion (19) in which the inter-piece (15) is fitted movably.

Each pin (14) is made wider in the front-rear direction than the inter-piece (15), and projecting edge portions (15a)(15b) which extend towards the side of each pin (14) are provided at upper and lower edge portion of the inter-piece (15), respectively.

In connecting together the links (11)(21) which are aligned in the width direction of the chain, the links (11)(21) are overlapped so that the front inserting portion (12) of one link (11)(21) corresponds to the rear inserting portion (13) of the other link (11)(21). The pin (14) is fixed in the rear inserting portion (13) of the one link (11)(21) and is fitted movably in the front inserting portion (12) of the other link (11)(21), while the inter-piece (15) is fitted movably in the rear inserting portion (13) of the one link (11)(21) and is fixed in the front inserting portion (12) of the other link (11)(21). Then, the links (11)(21) are allowed to bend relative to each other in the length direction (the front-rear direction) by relative rolling contact motions of the pin (14) and the inter-piece (15).

Upper and lower projecting arc-shaped holding portions (18a)(18b) are provided at a boundary portion between the pin fixing portion (18) and the inter-piece movable portion (19) of the links (11)(21) which stretch, respectively, to upper and lower recessed arc-shaped guiding portions (19a)(19b) of the inter-piece movable portion (19) for holding the pin (14) fixed in the pin fixing portion (18). Similarly, upper and lower projecting arc-shaped holding portions (17a)(17b) are provided at a boundary portion between the inter-piece fixing portion (17) and the pin movable portion (16) which stretch, respectively, to upper and lower recessed arc-shaped guiding portions (16a)(16b) of the pin movable portion (16) for holding the inter-piece (15) fixed in the inter-piece fixing portion (17).

A locus of a contact position between the pin (14) and the inter-piece (15) based on the pin (14) is referred to as an involute of a circle, and in this embodiment, a rolling contact surface (14a) of the pin (14) is referred to as an involute curve having a base circle of a radius Rb and a center M in cross section, while a rolling contact surface of the inter-piece (15) is referred to as a flat surface (a linear cross-sectional shape). By doing this, when each link (11)(21) shifts from a linear area to a curvilinear area or from the curvilinear area to the linear area of the chain (1), in the front inserting portion (12), the pin (14) moves relative to the inter-piece (15) which is in the fixed condition within the pin movable portion (16) while the rolling contact surface (14a) of the pin (14) roll contacts (including a slight slip contact) the rolling contact surface (15c) of the inter-piece (15). In the rear inserting portion (13), the inter-piece (15) moves relative to the pin (14) which is in the fixed condition within the pin movable portion (19) while the rolling contact surface (15c) of the inter-piece (15) roll contacts (including a slight slip contact) the rolling contact surface (14a) of the pin (14).

In this power transmission chain (1), by the pin repeating vertical movements, polygonal vibrations are generated, and the vibrations so generated cause noise. However, since the pin (14) and the inter-piece (15) move relatively while contacting each other and the locus of the contact position between the pin (14) and the inter-piece (15) based on the pin (14) is referred to as the involute of a circle, vibrations can be reduced to thereby reduce the noise level, compared with a case where respective contact surfaces of both the pin and the inter-piece are arc-shaped surfaces.

In order to reduce noise and vibration further, two or more links (11)(21) and pins (14) which have different shapes are preferably arranged at random, whereby the striking noise generating cycle is altered to be inconsistent, so that sound energy is dispersed to different frequency bands, thereby the peak of sound pressure level being reduced.

In FIGS. 2 and 3, portions denoted by reference character A and B are lines (points in the figures) where the pin (14) and the inter-piece (15) contact each other in the linear area of the chain (1), and a distance between A and B is a pitch length. When increasing the distance (pitch length) between A and B in the link (11) shown in FIG. 2, the link (21) shown in FIG. 3 results. Thus, the links (11)(21) are used which has the small pitch length and the large pitch length.

Figure 4:
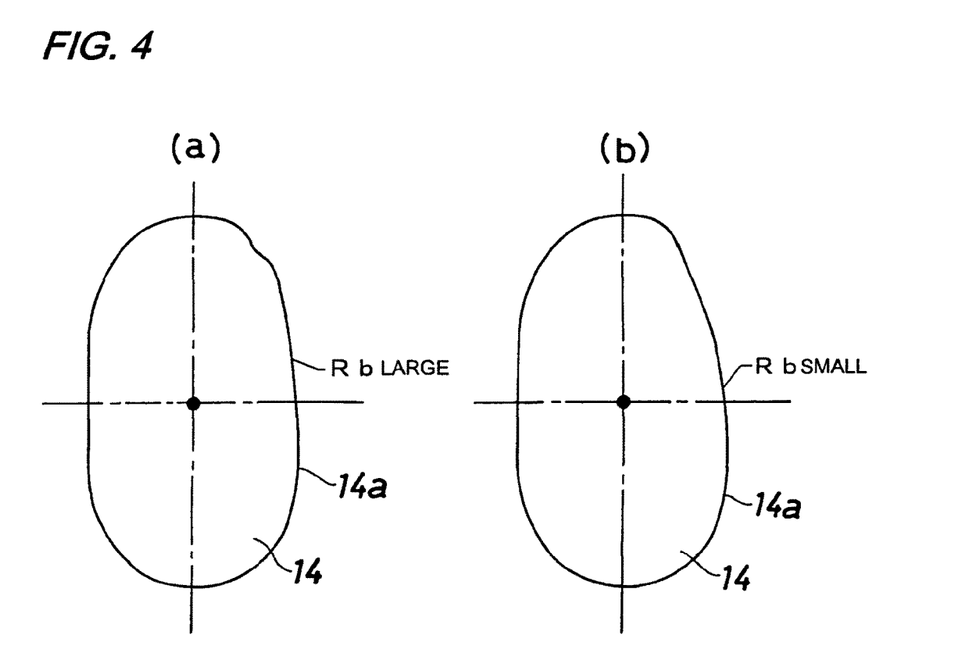
FIG. 4 is an enlarged side view showing a pin having a different shape.

In FIG. 4, as to the radius Rb of an involute curve of the pin (14), two types of pins are used, one in FIG. 4(a) of which the radius Rb of the involute curve is large and the other in FIG. 4(b) of which the radius Rb of the involute curve is small. These two types of pins (14) can be inserted through either of the link (11) in FIG. 2 which has the long pitch length and the link (21) in FIG. 3 which has the short pitch length. By combining these two types of pitch lengths of the link (11) (hereinafter, the small pitch length is referred to as "L1" while the large pitch length is referred to as "L2") with the two types of pin shapes (hereinafter, the large Rb is referred to as "P1" while the small Rb is referred to as "P2"), there can be produced four types of combinations of (L1, P1), (L1, P2), (L2, P1) and (L2, P2).

The conventional random arrangement is based on the random arrangement of the aforesaid four combinations, and it is considered good that all the four types of combinations come to appear after each combination. However, when considering the relative collision speed, since a combination having a large relative collision speed can be a cause for an increase in noise level, adopting the random arrangement simply possibly interrupts reduction in relative collision speed. Then, the reduction in noise level is realized by eliminating an unfavorable combination following the reference combination by paying attention to relative collision speed as below.

Figure 5:
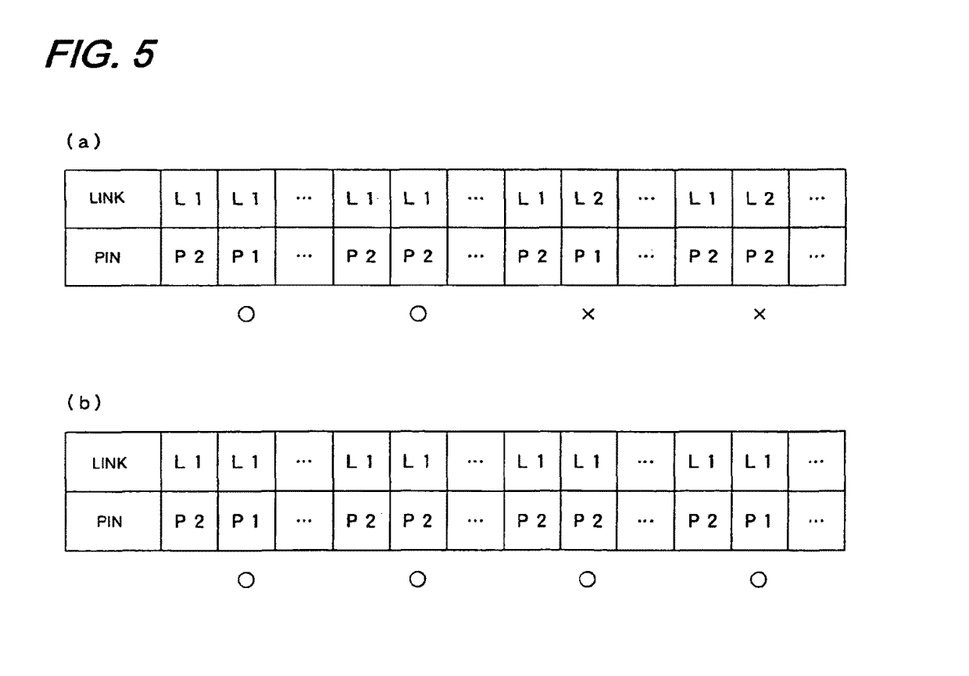
FIG. 5(a) shows an example of a conventional arrangement and FIG. 5(b) shows an example of an arrangement according to the invention.
Figure 6:
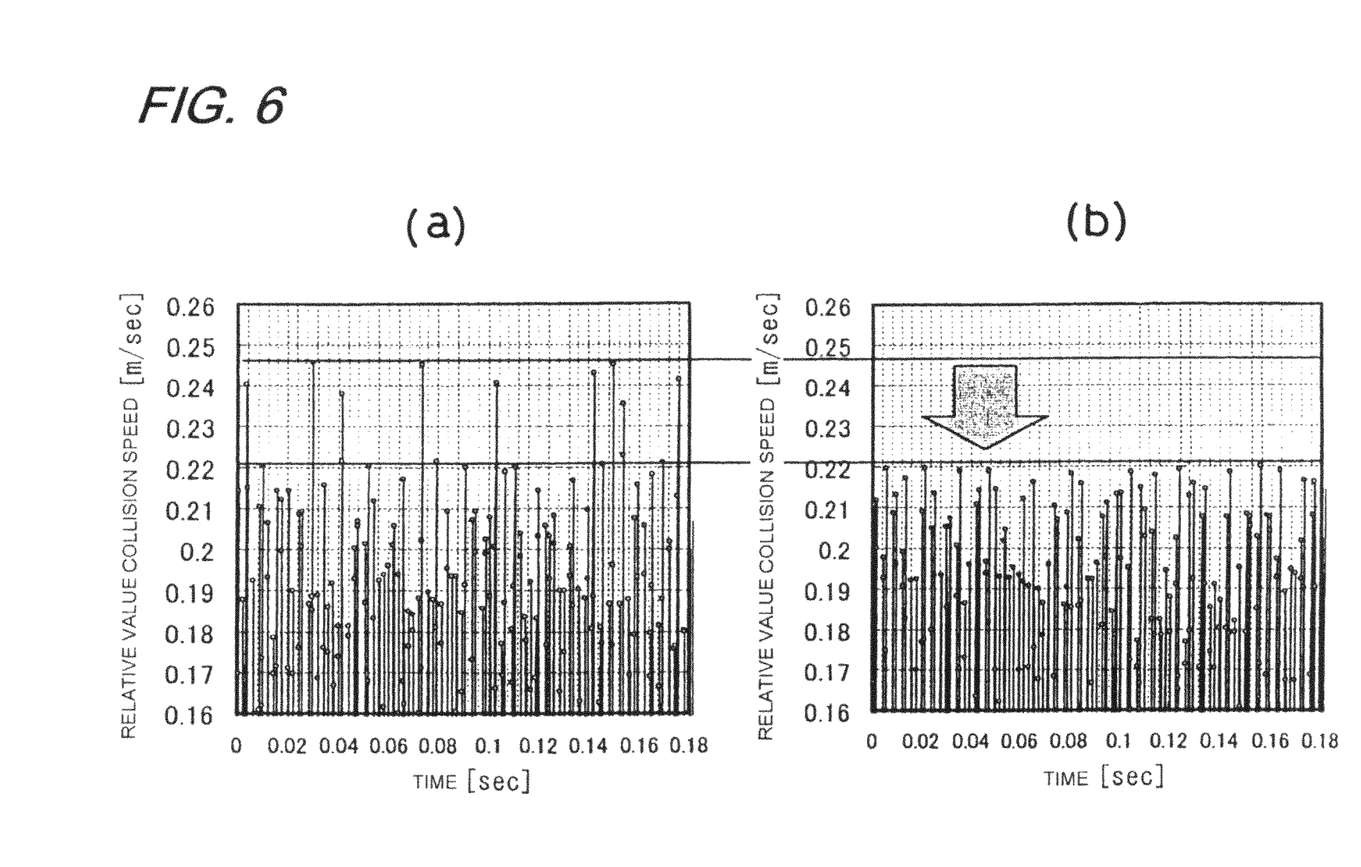

FIG. 5(a) shows an example of a conventional arrangement, in which, with respect to the front inserting portions of the links or the rear inserting portions of the links, all the four combinations appear after a combination of (L1, P2). A relative value collision speed (m/sec) for this conventional arrangement was obtained, and what was obtained is shown in FIG. 6(a). In FIG. 6(a), assuming that speeds exceeding 0.22 m/sec are referred to as a relative collision speed, it has been confirmed that this relative collision speed appears when a combination of (L2, P1) follows the combination of (L1, P2) or when a combination of (L2, P2) follows the same combination.

FIG. 5(b) shows a preferable arrangement example in which combinations that would produce the relative collision speed are eliminated based on knowledge on what was found as described above. Specifically, in the arrangement, with respect to the front inserting portions of the links or the rear inserting portions of the links, the combination of (L2, P1) that follows the combination of (L1, P2) is altered to the combination of (L1, P2) or the combination of (L1, P1) and the combination of (L2, P2) that follows the combination of (L1, P2) is also altered to the combination of (L1, P2) or the combination of (L1, P1). A relative collision speed for the arrangement in FIG. 5(b) was obtained and is now shown in FIG. 6(b). According to this, in the arrangement according to the invention, all the relative collision speeds are equal to or less than 0.22 m/sec, and it is seen that the combinations having large relative collision speeds that would be the cause for interruption to the reduction in noise level are eliminated with the advantage of the random arrangement left as it is.

In the above description, although as to the shapes of the pins, the pin P1 of which the curvature of the rolling contact surface is large and the pin P2 of which the curvature of the rolling contact surface is small are illustrated, even in the event that the two types of pins, the long pin and the short pin, are used, by the long pin being referred to as P1 and the short pin being referred to as P2, the same relative collision speed reducing effect (a bending angle reducing effect) as that described above can be obtained.

This power transmission chain (1) is used in a continuously variable V-type pulley transmission shown in FIG. 8. As this occurs, as is shown in FIG. 7, in such a state that end faces of the inter-piece 15 do not contact respective conical sheave surfaces (2c)(2d) of a fixed sheave (2a) and a movable sheave (2b) of a pulley (2) having a pulley shaft (2e), end faces of the drive pin (14) contact the conical sheave surfaces (2c)(2d) of the pulley (2), and power is transmitted by frictional force produced by the contact above.

Figure 7:
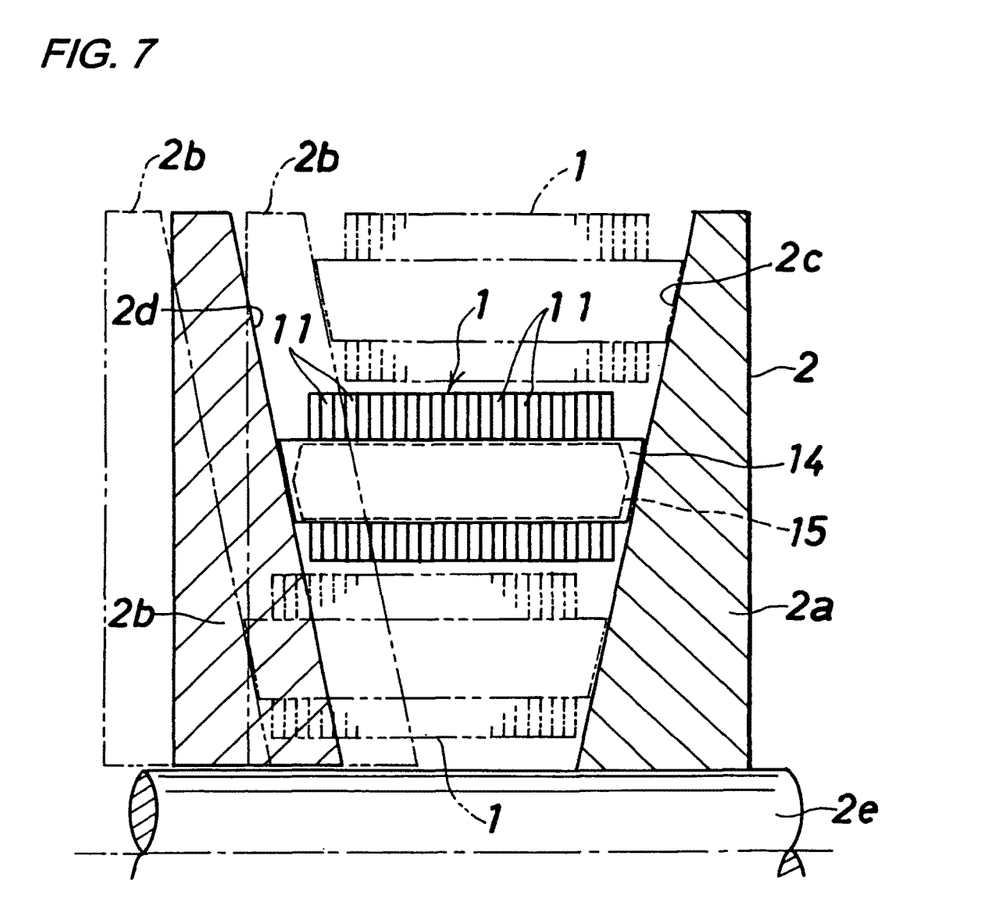
FIG. 7 is a front view showing a condition in which the power transmission chain is mounted on a pulley.

When the movable pulley half (2d) of the drive pulley 2 which is situated in a position indicated by solid lines is caused to move towards or away from the fixed sheave (2a), the wrap contact diameter of the drive pulley (2) is increased when the movable sheave (2b) moves towards the fixed sheave (2a) and is decreased when the movable sheave (2b) moves away from the fixed sheave (2a) as indicated by chain lines in FIG. 7. In a driven pulley (3), although illustration is omitted, when a movable sheave thereof moves in an opposite direction to the movable sheave (2b) of the drive pulley (2) to thereby increase the wrap contact diameter of the drive pulley (2), a wrap contact diameter of the driven pulley (3) is decreased, and conversely, when the wrap contact diameter of the drive pulley (2) is decreased, the wrap contact diameter of the driven pulley (3) is increased. As a result, based on a condition in which a one to one speed ratio (an initial value) results, an U/D (under drive) condition in which the wrap contact diameter of the drive pulley (2) is at minimum while the wrap contact diameter of the driven pulley (3) is at maximum is obtained, and an O/D (over drive) condition in which the wrap contact diameter of the drive pulley (2) is at maximum while the wrap contact diameter of the driven pulley (3) is at minimum.

The invention claimed is:

1. A power transmission chain, comprising:
a plurality of links each including front and rear inserting portions; and
a plurality of first pins inserted into the front and rear inserting portions and a plurality of second pins inserted into the front and rear inserting portions, the first pins and the second pins being aligned for connecting together the links that are aligned in a chain width direction so that the front inserting portion of a first one of the links corresponds to the rear inserting portion of a second one of the links,
wherein the links are configured to bend relative to each other in a length direction by relative rolling contact motions of the first and second pins,
wherein the links include two types of links, a link L1 having a small pitch length and a link L2 having a larger pitch length than the pitch length of the link L1, and the first pins include two types of pins, a long pin P1 and a short pin P2 having a shorter length than a length of the pin P1, and
wherein, with respect to either only the front inserting portions of the links or only the rear inserting portions of the links, the links and the pins are arranged so that only the second one of the links having one of a combination of the link L1 and the short pin P2, and a combination of the link L1 and the long pin P1 comes immediately after the first one of the links having a combination of the link L1 and the short pin P2 in a chain traveling direction.

2. A power transmission chain, comprising:
a plurality of links each including front and rear inserting portions; and
a plurality of first pins inserted into the front and rear inserting portions and a plurality of second pins inserted into the front and rear inserting portions, the first pins and the second pins being aligned for connecting together the links that are aligned in a chain width direction so that the front inserting portion of a first one of the links corresponds to the rear inserting portion of a second one of the links,
wherein the links are configured to bend relative to each other in a length direction by relative rolling contact motions of the first and second pins,
wherein the links include two types of links, a link L1 having a small pitch length and a link L2 having a larger pitch length than the pitch length of the link L1, and the first pins include two types of pins, a pin P1 having a rolling contact surface with a large radius of curvature and a pin P2 having a rolling contact surface with a smaller radius of curvature than the radius of curvature of the pin P1, and
wherein, with respect to either only the front inserting portions of the links or only the rear inserting portions of the links, the links and the pins are arranged so that only the second one of the links having one of a combination of the link L1 and the pin P2, and a combination of the link L1 and the pin P1 comes immediately after the first one of the links having a combination of the link L1 and the pin P2 in a chain traveling direction.

3. The power transmission chain according to claim 1, wherein one of the first pins and one of the second pins is inserted into each of the front and rear inserting portions.

4. The power transmission chain according to claim 1, wherein each of the pitch lengths of the link L1 and the link L2 is defined as a distance between a contact point of one of the first pins with one of the second pins, in the rear inserting portion, from a contact point of another one of the first pins with another one of the second pins, in the front inserting portion.

5. The power transmission chain according to claim 2, wherein one of the first pins and one of the second pins is inserted into each of the front and rear inserting portions.

6. The power transmission chain according to claim 2, wherein each of the pitch lengths of the link L1 and the link L2 is defined as a distance between a contact point of one of the first pins with one of the second pins, in the rear inserting portion, from a contact point of another one of the first pins with another one of the second pins, in the front inserting portion.

7. A power transmission system comprising a first pulley including conical sheave surfaces, a second pulley including conical sheave surfaces, and a power transmission chain extended between the first pulley and a second pulley, wherein the power transmission chain comprises the power transmission chain as set forth in claim 1.

8. A power transmission system comprising a first pulley including conical sheave surfaces, a second pulley including conical sheave surfaces, and a power transmission chain extended between the first pulley and a second pulley, wherein the power transmission chain comprises the power transmission chain as set forth in claim 2.

* * * * *